UNITED STATES PATENT OFFICE.

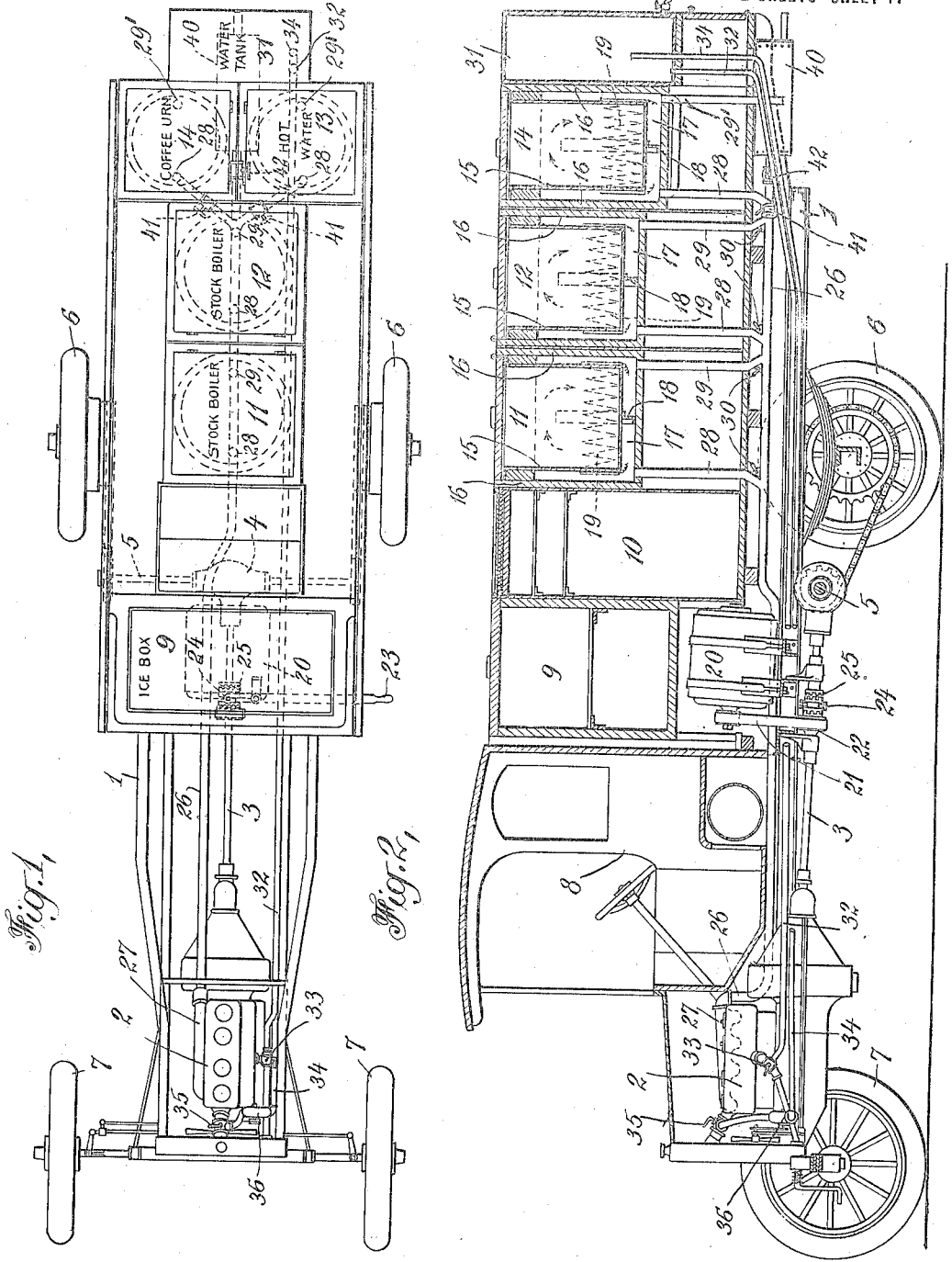

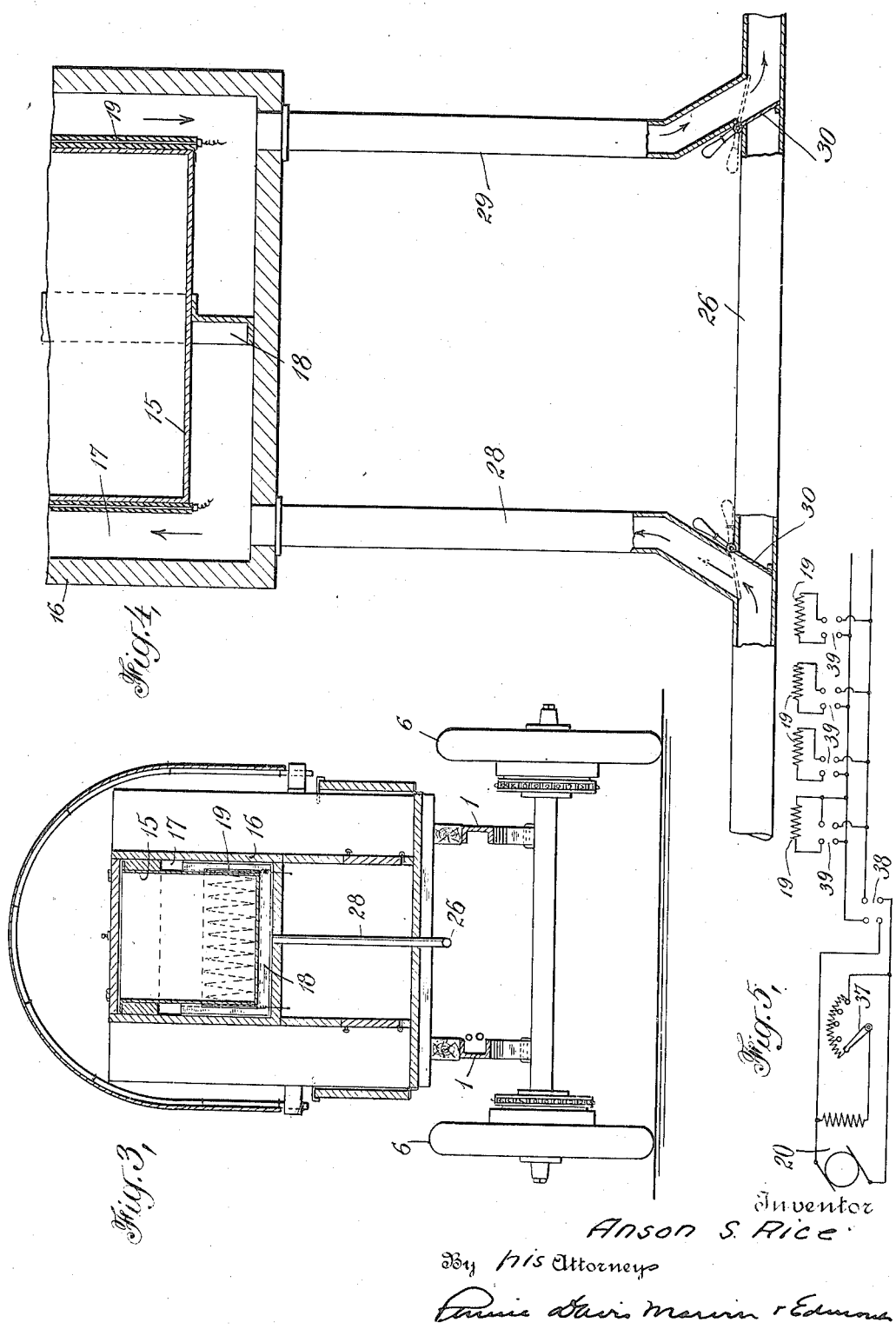

ANSON SHERMAN RICE, OF BROOKLYN, NEW YORK.

COOKING APPARATUS.

1,263,805.  Specification of Letters Patent.  Patented Apr. 23, 1918.

Application filed August 28, 1917. Serial No. 188,658.

*To all whom it may concern:*

Be it known that I, ANSON SHERMAN RICE, a citizen of the United States, residing at Brooklyn, in the county of Kings and State of New York, have invented certain new and useful Improvements in Cooking Apparatus; and I do hereby declare the following to be a full, clear, and exact description of the invention, such as will enable others skilled in the art to which it appertains to make and use the same.

The present invention embodies certain improvements over the cooking apparatus disclosed in my co-pending application Serial Number 172,972, filed June 5, 1917, which shows specifically an arrangement wherein air is circulated by a fan in conductive relation with the exhaust gas of an internal combustion engine to extract heat therefrom, and the air thus heated, and also heated by supplemental heating means, if desired, is then passed serially through unobstructed inclosed spaces surrounding the cooking vessels.

This application discloses a cooking vessel surrounded by heat insulating walls forming with it an inclosed space through which hot gas is circulated to heat the cooking vessel, and wherein a resistance heating unit, adapted to be supplied with electric current and preferably located in the inclosed space, is arranged to further heat the gas when desired, a barrier being provided in the inclosed space across the bottom and partly up the opposite sides of the vessel to compel the hot gases to flow into contact with a considerable portion of the walls thereof before passing out of the inclosed space.

The invention further comprehends the use of a plurality of such cooking vessels, adapted to be connected serially to a supply main conducting the hot gas, and each having its own electric heating unit so that the difference in temperature of the hot gas in contact with the several cooking vessels is minimized and the temperature of the cooking vessels thereby made more uniform throughout the series. Preferably, the inclosed space around each vessel has two branch connections to the supply main for the hot gas, each with a two-way valve at its junction so as to compel the desired portion of hot gas to pass from the main into the inclosed space, or to cut off the inclosed space from the main.

The gas supplied to the cooking vessel or vessels may be heated in any suitable way. However, in certain cases, I prefer to utilize as the hot gas the exhaust from an internal combustion engine, and to drive the generator from that engine for supplying the electric current of regulatable strength to the resistance heating unit or units. Thus, when considerable heat is required in the compartment containing the cooking vessel, the increased current supplied by the generator results in exhaust gas of higher temperature, and when less heat is required, the decreased current results in exhaust gas of lower temperature. In this way, temperature of the exhaust gas and the temperature of the heating unit or units conform at different loads, and the effectiveness of the system is thereby enhanced.

In the specific embodiment hereinafter disclosed, as an example of my invention, several cooking vessels are mounted on the chassis of an automobile to form a transport kitchen. I have found in such an arrangement that it is sometimes undesirable to drive the generator at the time the engine is driving the car, and also that the exhaust gas from the engine at that time is suitable in itself for cooking certain foods and for keeping partly or completely cooked foods hot during transport. I prefer, therefore, to provide a two-way coupling in the engine transmission for driving the generator alone or the car alone. Thus when the transport is at rest the generator may be driven by the engine to supply current to the heating units for hastening the cooking process, and when the transport is moving the exhaust gas alone is used to cook the food or keep it hot.

In order to abstract the heat in the cylinder walls and use that heat for cooking purposes, I provide a tank connected by delivery and return pipes through three-way valves to the usual radiator cooling system of the automobile. The tank contains sufficient water to provide for the proper cooling of the engine cylinders, and at the same time forms a supply of hot water for cooking or other purposes.

The accompanying drawings illustrate the preferred embodiment of my invention in application, as an example, to an automobile transport kitchen. In these drawings, Figure 1 is a plan view of the automobile showing the engine and transmission; Fig. 2 is a longitudinal section of the transport; Fig. 3 is a transverse section thereof; Fig. 4 is an enlarged view of a part of one of the cooking compartments; and Fig. 5 is a wiring diagram.

The automobile has a chassis comprising the usual frame members 1, internal combustion engine 2, transmission shaft 3, differential 4, rear driving shaft 5, driving wheels 6, and steering wheels 7. The tonneau has a driver's seat 8 and a number of compartments extending for substantially the full length and width of the tonneau. The several compartments comprise an ice-box 9, a switch compartment 10, stock boilers 11 and 12, hot water boiler 13, and a coffee-urn 14. Each of the compartments 11, 12, 13, 14, has a metal cooking vessel 15 forming with the insulating walls 16 an inclosed air space 17 around its sides and bottom. The barrier 18 extends across the bottom of the cooking vessel and partly up the sides thereof. Each of the cooking vessels has a resistance heating unit 19 arranged around it and adapted to be connected to the electric generator 20. The driving connection 21 drives the generator from pulley 22 loosely journaled on the transmission shaft 3 and forming a member of the two-way coupling operated by the handle 23. The intermediate part 24 of the coupling is splined on the transmission shaft and is adapted, in one position, to engage the pulley 22 to drive it, and, in a second position, to engage the coupling member 25 connected through the differential 4 to the rear driving shaft 5.

The supply main 26 is connected to the exhaust manifold 27 of the engine and has delivery and return branches 28 and 29 for each of the compartments 11 and 12, and a double Y-connection to the compartments 13 and 14 and the muffler 40. The branches to each compartment 11 and 12 communicate with the inclosed space 17 on the two sides of the barrier 18, and each has a two-way valve 30 at its junction with the supply main. The inclosed space 17 of the compartments 13 and 14 exhaust to the atmosphere through the pipes 29' when their valves 41 are open. The main 26 has a valve 42 for closing it to the atmosphere at that place when either of the compartments 13 or 14 is to be heated through the branches 28.

The water tank 31 has a delivery pipe 32 connected through a three-way valve 33 to the delivery pipe of the radiator cooling system of the engine, and also a return pipe 34 connected through a three-way valve 35 to the return pipe of that system, a pump 36, driven from the engine fan shaft, being provided for circulating water from the tank.

As shown in Fig. 5, the generator has a field regulator 37 for varying its voltage and thereby the current flowing to the resistance units 19. The generator switch 38 and the switches 39 connecting the separate heating units 19, and also the field regulator, are located in the switch compartment 10.

The operation of the arrangement hereinbefore described is as follows. Upon starting the transport into motion, the handle 23 of the two-way coupling is operated to connect the engine to the rear driving shaft, thereby disconnecting the generator from the transmission shaft. The valves 33 and 35 are preferably in the position for cutting in the radiator cooling system of the engine and cutting out the auxiliary cooling system supplied with water from the tank 31. The valves 30 are placed in position to connect the compartments to be heated and to disconnect the others from the supply main 26. Thus food may be heated in the compartments desired to cook it or keep it hot during transport.

When the automobile is at rest and the engine running, the handle 23 may be moved to the position in which the engine drives the generator and is disconnected from the rear driving shaft, and the valves 33 and 35 may be moved to replace the radiator cooling system by the auxiliary cooling system. The resistance heating units are then connected to the electric generator to hasten the cooking process in conjunction with the exhaust gas passing from the engine through the supply main and thence serially through the compartments then connected to the supply main by the valves 30. The field regulator 37 is operated to increase, as desired, the current supplied to the several heating units 19, to thereby cause an increase in the temperature of the exhaust gas as a result of the increased load on the engine, and a further increase as a result of the increased temperature of the heating units.

Having thus described my invention, what I claim is:

1. In cooking apparatus, a cooking vessel, heat insulating walls forming an inclosed space around the vessel, a barrier in said inclosed space extending underneath the vessel and partly up the sides thereof, a supply main for hot gas, and delivery and return branches connecting the supply main with the inclosed space on the two sides of the barrier.

2. In cooking apparatus, a cooking vessel, heat insulating walls forming an inclosed space around the vessel, a barrier in said inclosed space extending underneath the vessel and partly up the sides thereof, a resistance heating unit in said inclosed space, a source of current supply connected to the resistance unit, a supply main for hot gas, and delivery and return branches connecting the supply main with the inclosed space on the two sides of the barrier.

3. In cooking apparatus, a plurality of compartments each having a cooking vessel and heat insulating walls forming an inclosed space around the vessel, a supply main adapted to supply hot gas serially to the several compartments, a resistance heating unit in each of the inclosed spaces surrounding the cooking vessel, and a source of current supply electrically connected to the resistance units.

4. In cooking apparatus, the combination with an internal combustion engine having an exhaust manifold, and an electric generator driven by the engine, of a cooking vessel surrounded by an inclosed space communicating with the exhaust manifold, a resistance unit electrically connected to the generator and arranged to heat the cooking vessel in conjunction with the exhaust gas from the engine, and means for varying the current supplied by the generator to the resistance unit.

5. In cooking apparatus, the combination with an internal combustion engine having an exhaust manifold, and an electric generator driven by the engine, of a cooking vessel surrounded by an inclosed space communicating with the exhaust manifold, a resistance unit electrically connected to the generator and arranged in the inclosed space, and means for varying the current supplied by the generator to the resistance unit.

6. In cooking apparatus, the combination with an internal combustion engine having an exhaust manifold, and an electric generator driven by the engine, of a plurality of cooking compartments each surrounded by an inclosed space, a supply main in communication with the exhaust manifold, delivery and return branches connecting the supply main with the inclosed space of each compartment, a two-way valve at the junction of each branch with the supply main, and a resistance unit located in the inclosed space of each compartment and electrically connected to the generator.

7. In an automobile transport kitchen, an internal combustion engine having an exhaust manifold, an electric generator, a cooking vessel surrounded by an inclosed space communicating with the exhaust manifold, a resistance unit electrically connected to the generator, and a two-way coupling connecting either the generator or the driving shaft of the automobile to the engine.

8. In an automobile transport kitchen, an internal combustion engine having an exhaust manifold, an electric generator adapted to be driven by the engine, a cooking vessel surrounded by an inclosed space communicating with the exhaust manifold, a resistance unit electrically connected to the generator, a radiator water cooling system connected to the water jacket of the engine, an auxiliary water cooling system, and connections including three-way valves for connecting the radiator water cooling system and the auxiliary water cooling system to the water jacket of the engine.

9. In cooking apparatus, the combination with an internal combustion engine of a cooking vessel, walls forming an inclosed space around the vessel, a barrier in said inclosed space extending underneath the vessel and partly up the sides thereof, a supply main conducting the exhaust gas from the engine, a connection from the supply main to the inclosed space on one side of the barrier therein, and a connection to the atmosphere from the inclosed space on the other side of the barrier therein.

In testimony whereof I affix my signature.

ANSON SHERMAN RICE.